Dec. 26, 1922.
G. H. CARLSON.
HAYING IMPLEMENT.
FILED FEB. 9, 1920.
1,439,942
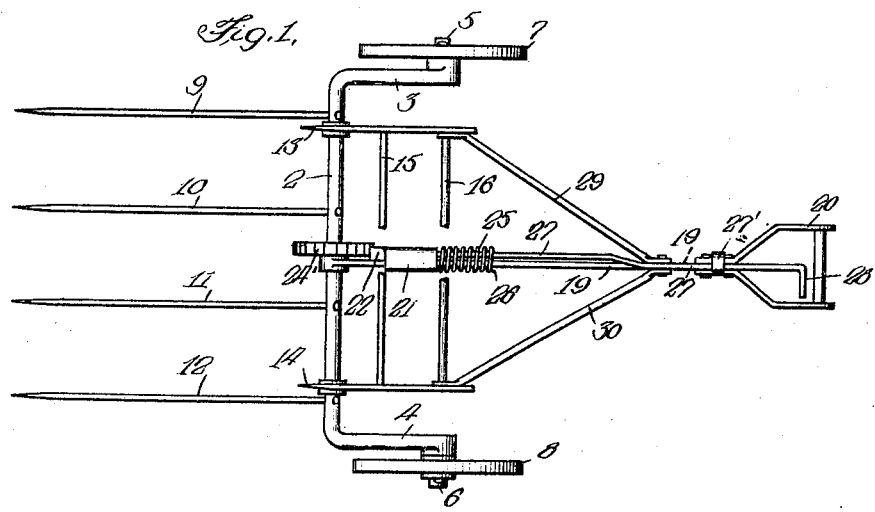
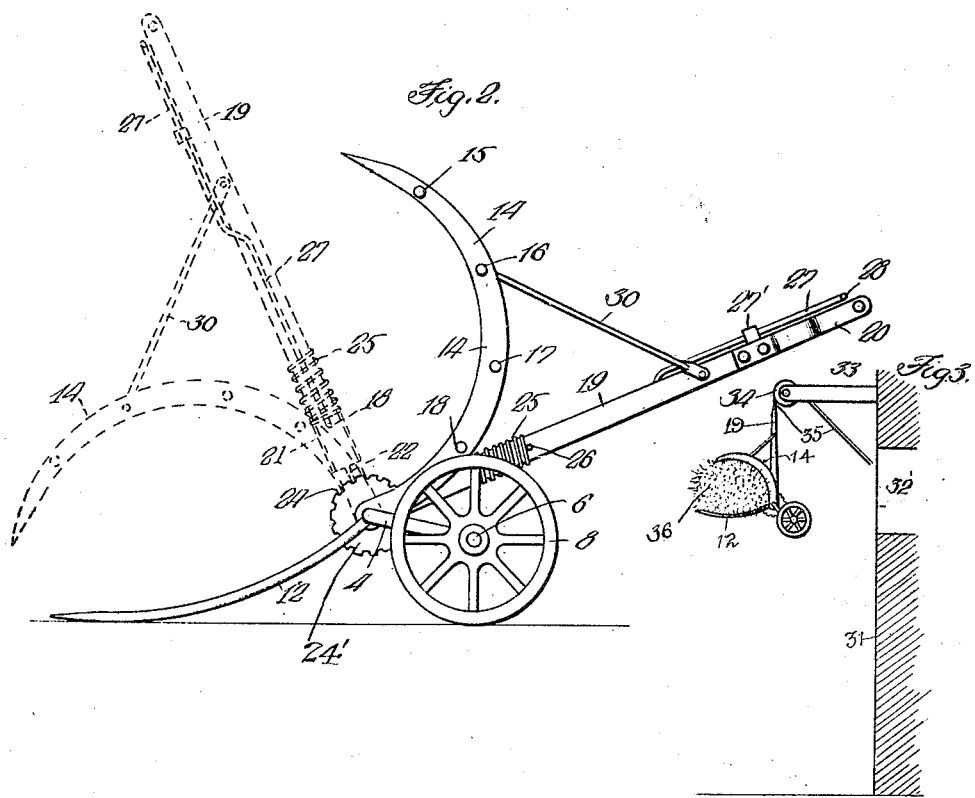
Inventor:
Gustaf H. Carlson Patented Dec. 26, 1922.

1,439,942

UNITED STATES PATENT OFFICE.

GUSTAF H. CARLSON, OF ADRIAN, MICHIGAN.

HAYING IMPLEMENT.

Application filed February 9, 1920. Serial No. 357,459.

*To all whom it may concern:*

Be it known that I, GUSTAF H. CARLSON, a citizen of Sweden, residing at Adrian, Lenawee County, Michigan, have invented certain new and useful Improvements in Haying Implements, of which the following is a specification.

My invention relates to agricultural implements and has particular reference to a combination hay fork on wheels and hay-hoisting grip. The object of the present improvement is to provide a hay fork of sufficiently large capacity to gather a small load of hay and to carry said load to a stack or hay-loft without the intervention of the loading and unloading process incidental to the ordinary pitch-fork.

With the above named object in view my invention consists in the novel construction, combination and arrangement of parts, all as hereinafter described in detail, illustrated in the accompanying drawing, and more particularly pointed out in the appended claims.

In the drawing—

Figure 1 is a plan view of a hay-fork mounted on wheels and embodying my invention.

Figure 2 is a side elevation with a closed position of the grip members shown by dotted lines.

Figure 3 is a reduced view of the fork loaded and hoisted towards a storage place.

In the several views 2 represents the axial portion of a bell-crank form of axle with parallel arms 3 and 4 bent at right angles thereto and terminating in wheel-spindle portions 5 and 6 bent parallel with the portion 2, and carrying wheels 7 and 8.

The portion 2 is substantially the head of a hay fork to be hoisted by mechanical instead of manual power, as indicated in Figure 3. To the part 2 is secured a suitable number of tines 9, 10, 11 and 12 and on it are journaled a pair of tines or grip members 13 and 14 which are caused to co-operate with the tines 9 to 12, as indicated by dotted lines in Figure 2, to hold against displacement a shock or bundle of hay while being transported and hoisted to the storage place. The members 13 and 14 are curved oppositely to the members 9 to 12 and are connected by cross-rods 15, 16, 17 and 18 which may be either more or less in number indicated in Figure 2 and are secured at their ends to said members 13 and 14. Intermediate of the latter a handle 19 is pivoted on the axial portion 2 at its inner end, the outer end being provided with a hand-grip 20. On the handle or bar is slidably mounted a sleeve or collar 21 which carries a detent 22 that is engageable adjustably with notches 24 in a disk or quadrant 24' that is keyed or secured to the axle portion 2. The detent 22 is normally held in engagement with one of the notches 24 by means of a coiled spring 25 on the bar 19, one end of which spring bears against a pin or lug 26 on said bar while the other end bears against the end of the sleeve 21. To the sleeve 21 is secured one end of a finger lever rod 27. The opposite end of this rod is bent at right angles and arranged within the loop of the grip portion 20 to provide a finger hold portion 28 whereby the substantially integral members 22, 21, 27 and 28 may be moved to release the detent 22 against the resistance of the spring 25. The handle bar 19 is braced by a pair of diagonal braces 29 and 30 on the members 13 and 14 and at the hand-grip portion 20 said bar has thereon an eye 27' in which the rod 27 is slidable.

In Figure 3, 31 represents the wall of a barn having therein a hay loft opening 32 and provided with the usual pulley beam 33 carrying a pulley 34 over which passes a rope 35 one end of which is secured in any suitable manner to the implement, as to the grip portion 20 as in said Figure 3. In said Figure 3 the co-operating jaws of the fork are shown engaged with a fork-full of hay or other like material in position to be drawn into the opening 32.

The jaw-members 13 to 18 may be swung by the handle bar 19 toward the fork proper, consisting of the parts 2, 9, 10, 11, and 12, to varying degrees from a partial fork-full to the maximum quantity that it will hold. The implement may be operated with the parts in the full line positions shown in Figure 2, by pushing it along windrows of hay to load the fork, or by pushing the fork under cocks of hay into which such windrows had been previously thrown. In the case of coarse grass it may in addition serve as a rake to gather up the crop from the position in which it has been left by a mower. The implement is equally well adapted to be drawn by animal or motor power, the operator merely guiding the fork by means of the handle bar 19. The implement is, however, particularly serviceable in gathering small crops of hay and where the more elaborate hay-sweeps, horse-power rakes, hay-rack loading with all the usual equipment for more extensive haying are not available. In the present device the small farmer or gardener is enabled to dispense with the hay-wagon, etc. and during the haying season oftentimes unavailable help required for gathering hay by the usual methods. During all seasons considerable fodder is carried on pitchforks and in the arms to temporary feeding pens, and the present invention provides a double grip fork of large capacity and light weight that will greatly lessen the strains and amount of this form of farm and ranch labor.

Having thus described my invention, I claim as new and desire to secure by Letters Patent:—

1. The combination with two sets of hay fork tines, of a carriage on which said tines are mounted, one set of said tines being mounted to slide along the ground, while the other set is movable angularly thereto, and each set having its tines curved oppositely to the curvature of the tines of the other set, the two sets forming a pair of jaws, means for moving said jaws toward and from each other, and adjustable means for rendering said jaws substantially immovable relative to each other.

2. The combination with two hay-forks, each consisting of a series of curved tines, of a carriage on which said forks are mounted and movable relative to each other as co-operating jaws, a lever for moving said jaws toward and from each other, and means for adjustably holding said jaws in variably fixed relation to each other.

In testimony whereof I have hereunto subscribed my name.

GUSTAF H. CARLSON.